United States Patent [19]

Stummer

[11] 4,038,592
[45] July 26, 1977

[54] VOLTAGE AND FREQUENCY CONTROL CIRCUIT

[75] Inventor: Franz Stummer, Noham, Germany

[73] Assignee: Alberto Kling, Germany

[21] Appl. No.: 614,235

[22] Filed: Sept. 17, 1975

[30] Foreign Application Priority Data

July 30, 1975  Germany .............................. 2534090

[51] Int. Cl.² ........................................... H02M 5/257
[52] U.S. Cl. ..................................... 363/165; 363/161
[58] Field of Search ........................... 321/4, 60, 69 R; 322/32

[56] References Cited

U.S. PATENT DOCUMENTS

| | | | |
|---|---|---|---|
| 2,776,379 | 1/1957 | Sargeant | 321/4 X |
| 3,094,850 | 6/1963 | Newton | 321/4 X |
| 3,214,690 | 10/1965 | Salisbury | 321/4 X |
| 3,593,104 | 7/1971 | Fisher et al. | 321/4 |
| 3,916,284 | 10/1975 | Hilgendorf | 321/60 |
| B 466,318 | 3/1976 | South et al. | 322/32 X |

Primary Examiner—William M. Shoop

Attorney, Agent, or Firm—Hubbard, Thurman, Turner & Tucker

[57] ABSTRACT

A voltage and frequency control circuit converts an alternating current input signal with inconstant frequency and voltage amplitude to an alternating current output signal with constant voltage amplitude and a constant nominal frequency which is lower than the lowest occurring frequency of the input signal. An amplitude control circuit converts the input signal to an ac signal having constant voltage amplitude. A rectifier circuit is regulated by an ac voltage source to provide positive half-cycles of the output signal from the amplitude control circuit during the positive half of the ac voltage source cycle and to provide negative half-cycles of the output signal during the negative half of the ac voltage source cycle. A filter circuit smooths and shapes the output of the rectifier circuit to provide a sinusoidal output signal having constant voltage amplitude and constant frequency. The amplitude control circuit, rectifier circuit and filter circuit may be connected together in any order to achieve the desired output signal. Also disclosed are variations which provide multiple output signals from a single input signal and a single output signal from multiple input signals.

15 Claims, 8 Drawing Figures

VOLTAGE AND FREQUENCY CONTROL CIRCUIT

BACKGROUND AND SUMMARY OF THE INVENTION

This invention relates to a voltage and frequency control circuit for converting an input ac voltage with inconstant frequency and amplitude into an ac voltage with constant amplitude and a constant nominal frequency which is lower than the lowest occurring frequency of the input ac voltage.

When using generators whose speed is not controlled, both the amplitude as well as the frequency of the ac voltage which is produced is not constant. In this case of a generator with a relatively low output, e.g. a generator driven by a windmill, it is neither economical nor expedient to provide control equipment for maintaining the frequency and amplitude at a constant level, as it is already known in the case of generators which are employed in large power stations. Frequently, the ac voltage produces has also a substantially higher frequency than the conventional main frequency of 50 or 60 cps. For instance, when converting the wind energy in windmills using generators suitable for this purpose, ac voltages occur which have frequencies ranging from approximately 300 to 800 cps which deviate by up to 40% from a mean frequency according to the rotational speed at the moment. The deviations of the amplitude from a mean amplitude value also are of this same magnitude.

The object of the present invention is to provide a simple voltage and frequency control circuit for converting the frequency as well as the amplitude of an inconstant ac voltage into an ac voltage with a constant predetermined frequency and amplitude.

This object is accomplished in accordance with the present invention in that the input ac voltage to be converted is supplied to a control circuit consisting of a series of switching units including an amplitude control circuit, a regulatable rectifier circuit and a filter circuit. The amplitude control circuit is designed such that it converts an ac voltage of inconstant amplitude on the input side into an ac voltage of constant amplitude on the output side. The regulatable rectifier circuit is regulated by an ac voltage source which supplies a control ac voltage with nominal frequency such that in the half-cycles in which the control ac voltage has positive polarity, half-waves of the input ac voltage are produced with a first polarity and in the half-cycles in which the control ac voltage has negative polarity, half-waves are produced with a second polarity. The filter circuit is provided such that at least approximate smoothing and sine wave shaping occurs.

In a preferred embodiment of the rectifier circuit of the present invention, the input ac voltage whose frequency exceeds the frequency of the desired output ac voltage (50 to 60 cps) is rectified such that the positive and negative half-waves of the input ac voltage have a first polarity during the positive half-waves of a control ac voltage with a frequency equal to that of the desired output ac voltage. Similarly, the positive and negative half-waves of the input voltage have a second polarity opposite to the first polarity during the negative half-waves of the control voltage. Assuming a control ac voltage of 50 cps (period of 20 msec), half-waves with positive or negative amplitude are produced by this rectification during successive intervals of 10 msec, respectively. In the amplitude control circuit unit, either the input ac voltage or the already rectified ac voltage is converted into an output ac voltage with constant amplitude. In addition, the filter circuit is provided for producing the rectified ac voltage in an approximately sinusoidal ac voltage having the desired frequency, e.g. 50 cps. It is also possible in principle to provide the amplitude control circuit directly in front of the output of the entire control circuit, i.e. to rectify the input ac voltage first, then permit it to pass through a filter and finally, stabilize the amplitude of the resultant output voltage. Since an increase in generator speed results simultaneously in an increase in frequency as well as in voltage and in the output of the ac voltage which is produced, the present invention has the advantage that the transformer employed is always dimensioned optimally, since at higher frequencies higher outputs can be transferred.

Further advantageous features are described in the claims.

DESCRIPTION OF THE DRAWINGS

The invention will now be explained in more detail in the following with reference to embodiments illustrated in the accompanying drawings wherein.

Figure 1:
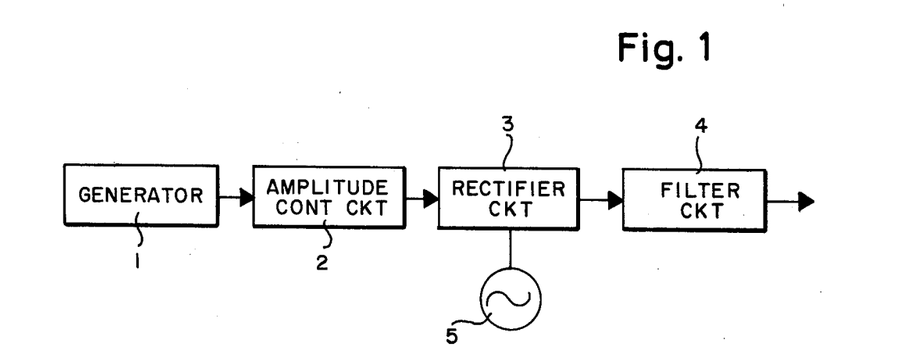
FIG. 1 is a schematic block circuit diagram of a control circuit according to the present invention.

FIG. 1 illustrates the principal structure of the control circuit. This consists of the series connection of a generator 1, am amplitude control circuit 2, a rectifier circuit 3 and a filter circuit 4. A control ac voltage source 5 which operates with a control ac voltage of 50 or 60 cps is connected to the rectifier circuit 3.

Figure 2:
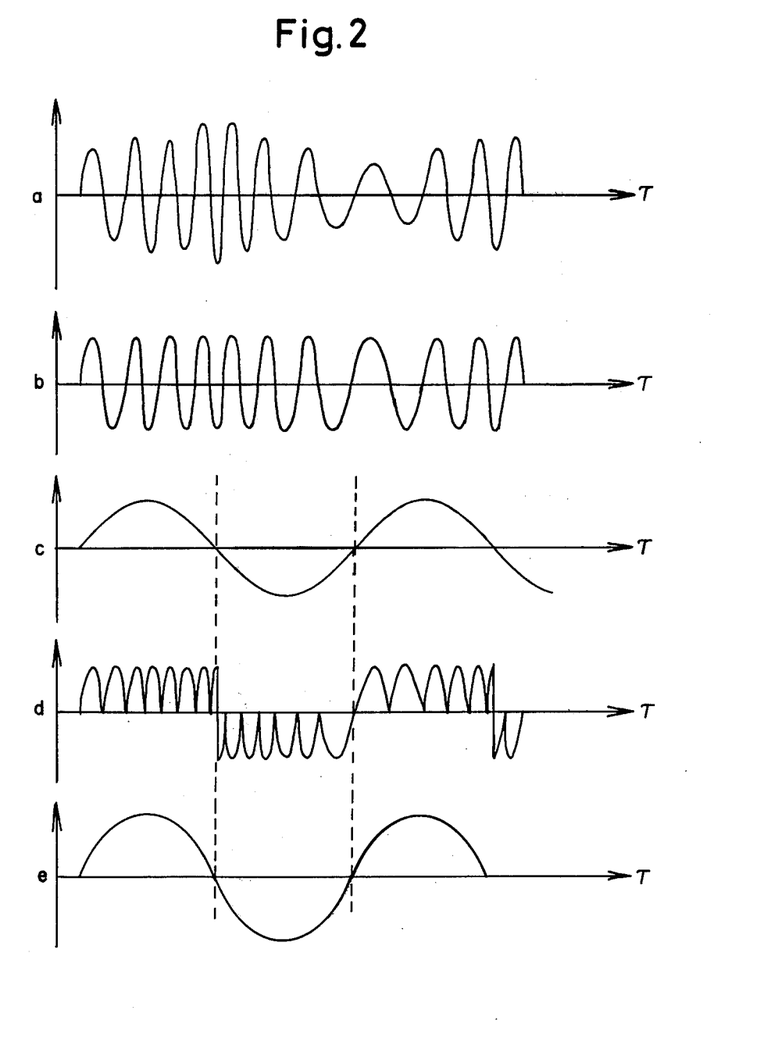
FIG. 2 provides five graphs depicting voltage amplitude versus time at critical points in the circuit illustrated in FIG. 1.

The basic mode of function of this control circuit will be described in the following with references to FIGS. 1 and 2. The generator 1 generates an ac voltage which is designated a in FIG. 2 and which has neither constant frequency nor constant amplitude. The frequency and amplitude fluctuations are greatly exaggerated in this figure as compared with practical cases. The output signal of the generator 1 is supplied to the amplitude control circuit 2 and is converted to an output signal with constant amplitude. This ac voltage, whose amplitude is constant, but whose frequency is still inconstant, is designated as b in FIG. 2. The output of control circuit 2 is supplied to the rectifier circuit 3 which is controlled by control ac voltage from the control ac voltage source 5 in the following manner. The control ac voltage is designated as c in FIG. 2. This control ac voltage has a frequency the same as the output signal is supposed to have at the end of the filter circuit 4. This frequency is preferably 50 or 60 cps but may have other values. The rectifier circuit 3 is designed, preferably as a full-wave rectifier circuit, positive and negative half-waves being produced in response to the positive and negative half-cycles respectively of the control ac voltage source 5. This is possible in a simple manner with a circuit arrangement as is shown schematically in FIG. 3. The rectifier block 6 shown is a conventional full-wave rectifier bridge which serves to produce output ac voltages of one polarity from an ac voltage which is supplied at the input. The rectifier block 6 is connected to a two-pole controllable reversing switch 7 which connects the voltage supplied by the rectifier block 6 to the output of the rectifier circuit 3 in the same or reverse polarity according to the switcing state of switch 7. In so doing, control is effected by the control ac voltage source 5 in a manner to be described herein. By switching the controllable reversing switch 7, half-wave trains with positive and negative polarity are formed selectively in the output lines of the rectifier circuit 3. The reversing switch 7 is always switched when the control ac voltage passes through zero, thereby generating an ac voltage d as shown in FIG. 2 at the output of the rectifier circuit 3. During the first half-cycle of the illustratedcontrol ac voltage c, half-waves with positive polarity are formed at the output of the rectifier circuit 3. During the next zero-axis crossing of the control ac voltage c, the switch 7 is reversed so that half-waves with negative polarity are produced at the output of the rectifier circuit 3. This state of the reversing switch 7 is retained until the control ac voltage again passes through zero. During the zero-axis crossing the reversing switch 7 is again returned to its original state and half-waves with positive polarity are again produced. The ac voltage d is smoothed in the filter circuit 4 following the rectifier circuit 3 so that an ac voltage which approximates a sine wave may be tapped at the output of the filter circuit 4.

The sequence of amplitude control circuit 2, rectifier circuit 3 and filter circuit 4 shown in FIG. 1 may be varied almost arbitrarily. For example, the amplitude control circuit 2 may be provided downstream of the rectifier circuit 3. In this case, the ac voltage which is initially rectified by the rectifier circuit 3 has an amplitude which is not yet constant and is consequently rendered constant by means of the amplitude control circuit 2, which, however, may also be provided downstream of the filter circuit 4. In this case, the filter circuit 4 processes an ac voltage whose amplitude is still inconstant and the amplitude of an ac voltage of the output frequency is requlated by means of the amplitude control circuit 2. The important point is that the ac voltage from the generator 1 to be processed passes through all three circuit parts, i.e. the amplitude control circuit 2, the rectifier circit 3 and the filter circuit 4.

Figure 4:
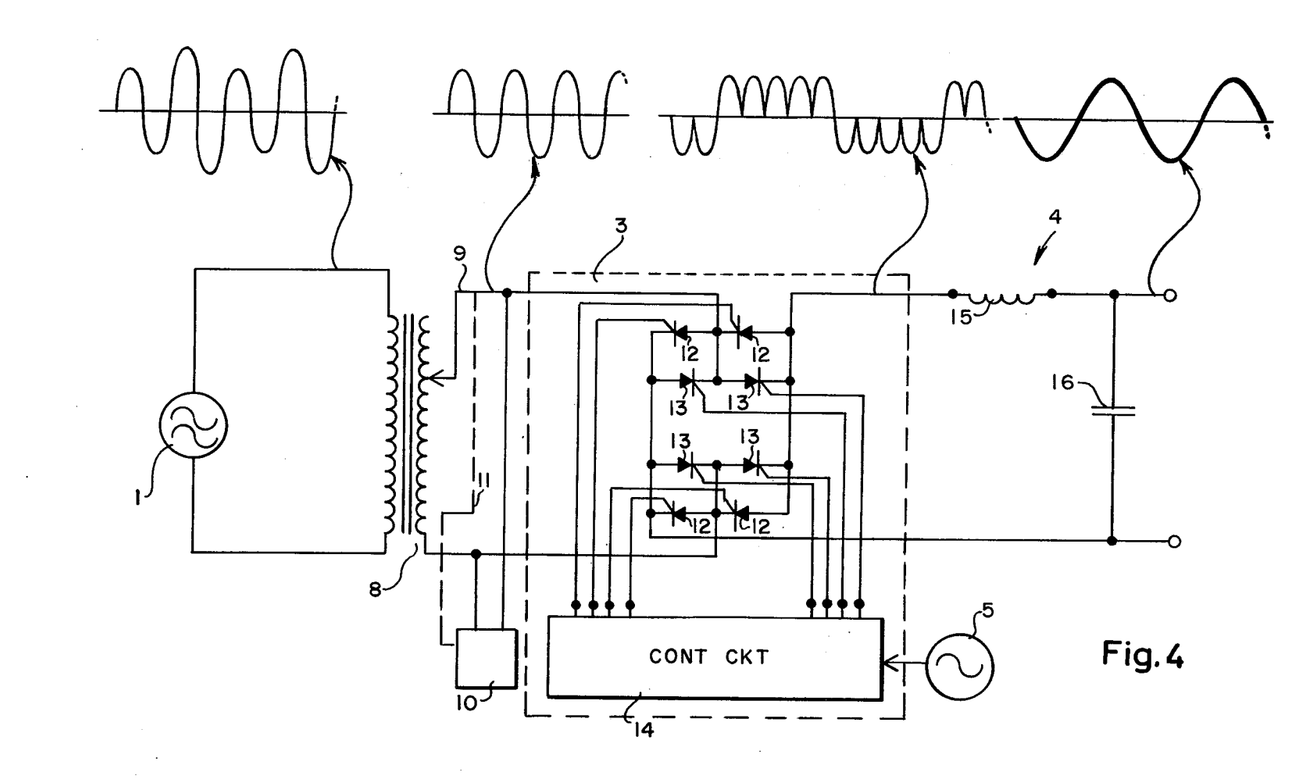
FIG. 4 is a schematic circuit diagram of a control circuit according to the embodiment illustrated in FIG. 1.

A preferred embodiment of a control circuit is illustrated in FIG. 4 and the sequence of the individual circuit parts thereof corresponds to FIG. 1. The generator 1 is connected to an amplitude control circuit designed as a regulating transformer 8. The tap 9 of the regulating transformer 8 is connected to the secondary winding of this transformer at a location such that the desired output voltage amplitude is produced on the secondary side of the regulating transformer 8. This regulation can be executed in a manner known from the prior art, e.g. by a voltmeter 10 which is provided with an actuating drive 11 for the tap 9. Instead of a voltmeter 10, a constant voltage source and a differential amplifier may also be provided to drive the actuating drive. The rectifier circuit 3 in this embodiment contains two rectifier bridge circuits whose individual bridge elements are designed as thyristors. The thyristors belonging to the first bridge circuit are designated 12, whereas the thyristors belonging to the second bridge circuit are designated 13. The two bridge circuits are both connected in parallel on their ac voltage side as well as on their dc voltage side. Only the poling of the individual thyristors 12 and 13 are selected differently in the two bridge circuits. These thyristors 12 and 13 are connected to a control circuit 14 which serves to switch either the thyristors 12 or thyristors 13 into their conducting state. When thyristors 12 are in the conducting state, negative half-waves are produced in the upper output line of the rectifier circuit 3 in the drawing, whereas positive halfwaves are produced there when thyristors 13 are in the conducting state. The control circuit 14 is connected to the control ac voltage source 5 which causes the control circuit 14 to make a change over form one rectifier bridge to the other respectively during the zero-axis crossings of the control ac voltage. Unlike the basic graphs of FIG. 2, switching with such a transistor circuit does not always occur exactly at the times at which the control ac voltage 2c passes through zero because a thyristor, once open, remains in its opened state until the holding current falls short. In practice this means that a reversal can only be executed during the zero-axis crossing of the generator ac voltage a, i.e. at times which, under certain circumstances, occur slightly before at which the control ac voltage passes through zero. In the case of an ac voltage to be rectified whose frequency exceeds substantially that of the nominal frequency, that is the frequency of the control voltage, this deviation is not significant and may be readily compensated for by means of the filter circuit. This modification, however, has the substantial advantage that no induction peaks are generated in the filter or transformer. The filter circuit 4 consists merely of a series inductance 15 and a parallel capacitance 16 at the output of the control circuit in this embodiment. The inductance 15 and the capacitance 16 are dimensioned by the formula $2\pi f = 1/\sqrt{LC}$, where $f$ is the frequency of the output ac voltage, $L$ the value of the inductance and $C$ the value of the capacitance. This filter circuit constitutes an especially simple embodiment with which a fairly well approximated sinusoidal path of the output ac voltage has already been achieved. If the harmonics contained therein are attenuated to an even greater extent, it is advisable to connect a plurality of such LC members in series to form a filter network. However, other filter circuits as are known from the prior art may also be used on an optional basis to smooth the voltage.

Figure 5:
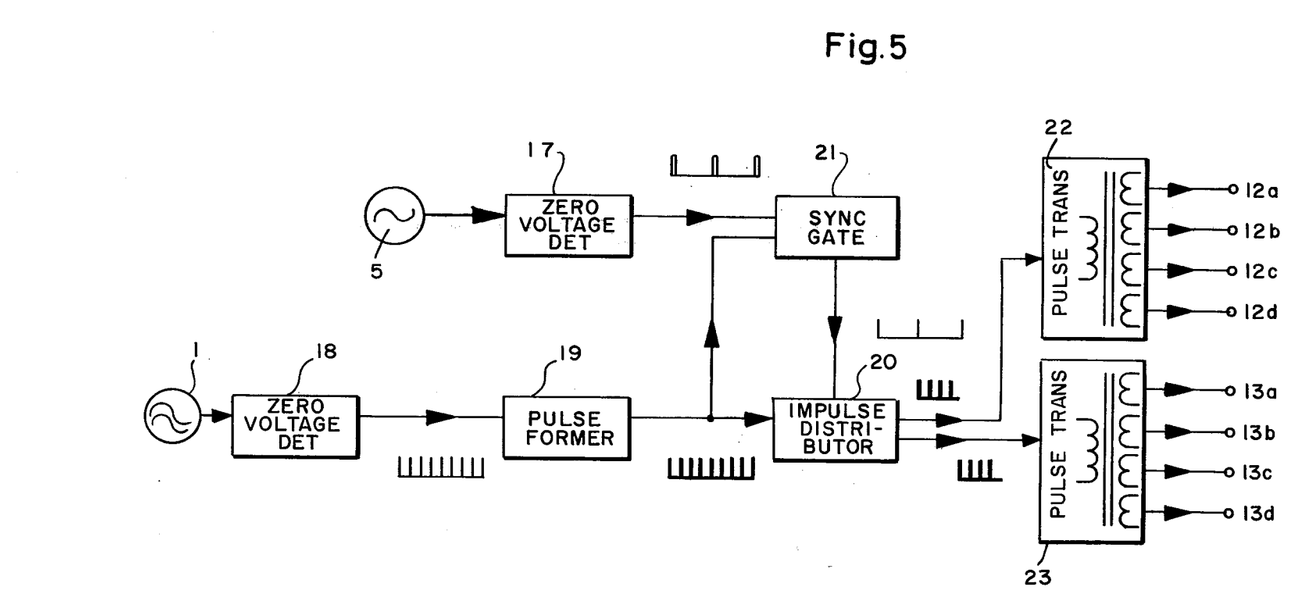
FIG. 5 is a schematic circuit diagram of a further control circuit employed in the control circuit of the embodiment according to FIG. 4.

A particularly simple embodiment for the control circuit 14 according to the embodiment in FIG. 4 is illustrated in FIG. 5. This control circuit 14 contains two conventional zero voltage detectors 17 and 18, to the input sides of which the control ac voltage source 5 and the generator 1 are connected. The generator 1 itself does not necessarily have to be connected to the zero voltage detector 18; it would suffice if an ac voltage with the same phase as the output ac voltage of the generator 1 is supplied to zero voltage detector 18. These zero voltage detectors each produce an impulse at the output thereof when the input ac voltage passes through zero. Such zero voltage detectors are already known in the prior art and do not have to be described in more detail here. A pulse former 19 whose output signal is supplied to a first input of an impulsedistributor 20 is connected to the output of said zero voltage detector 18. Pulse former 19 is a conventional pulse shaping circuit for lengthening and shaping square wave pulses. The impulse distributor 20 has two control outouts, each of which is connected to a pulse transformer 22 and 23. Distributor 20 is a conventional circuit which switches the input pulses from pulse former 19 alternately between the two outputs of the distributor circuit in response to pulses from a sync gate 21. The pulse transformers 22, 23 each have four output lines 12a to 12d and 13a to 13d which may be connected to the control inputs of the thyristors 12 and 13 respectively of the rectifier circuit 3 according to FIG. 4. Pulse transformers 22 and 23 are conventional circuits for providing four pulse outputs each equal to a pulse input. The output of the zero voltage detector 17 is connected with the first input of a sync gate 21 having a second input connected to the output signal of the pulse former 19. The output of the sync gate 21 is connected to the second input of the impulse distributor 20. Sync gate 21 is a conventional circuit which provides an output pulse for every first input pulse unless a second input pulse is in process.

The mode of operation of the control circuit according to FIG. 5 is as follows. The impulse distributor 20 switches the impulses which are supplied from the pulse former 19 to one of the two outputs of distributor 20 alternately. This switching from one output to the other is accomplished in response to the occurrence of a signal from the sync gate 21. The sync gate 21 produces an output signal every time an impulse from the zero voltage detector 17 is supplied to the input side thereof which is not simultaneous with an impulse from the pulse former 19. In the event that the zero-axis crossings of the control voltage and the generator voltage coincide in time or are very close to one another, it must be ensured that the impulse distributor 20 does not switch during a pulse from former 19. This is accomplished in a simple manner in that the pulses from the pulse former 19 are shortened to be shorter than the impulses from the zero voltage detector 17. If the impulse from the zero voltage detector 17 begins before the pulse begins from the pulse former 19 the sync gate 21 produces an impulse, since the impulse from the zero voltage detector 17 coincides with or overlaps the impulse from the pulse former 19. If the impulse from the pulse former 19 begins before the beginning of the impulse from the zero voltage detector 17, this impulse from the pulse former 19 is transmitted to the already switched output of the impulse distributor 20 without switching outputs of distributor 20. In other words, the sync gate 21 ensures that the impulse distributor 20 only switches in the intervals between the impulses from the pulses former 19 so that it is guaranteed that one half of a pulse from the pulse former 19 is not switched to the one output line of distributor 20 while the other half of the pulse is switched to the other output line, whereby both bridge circuits 12, 13 would be rendered conductive simultaneously.

Figure 6:
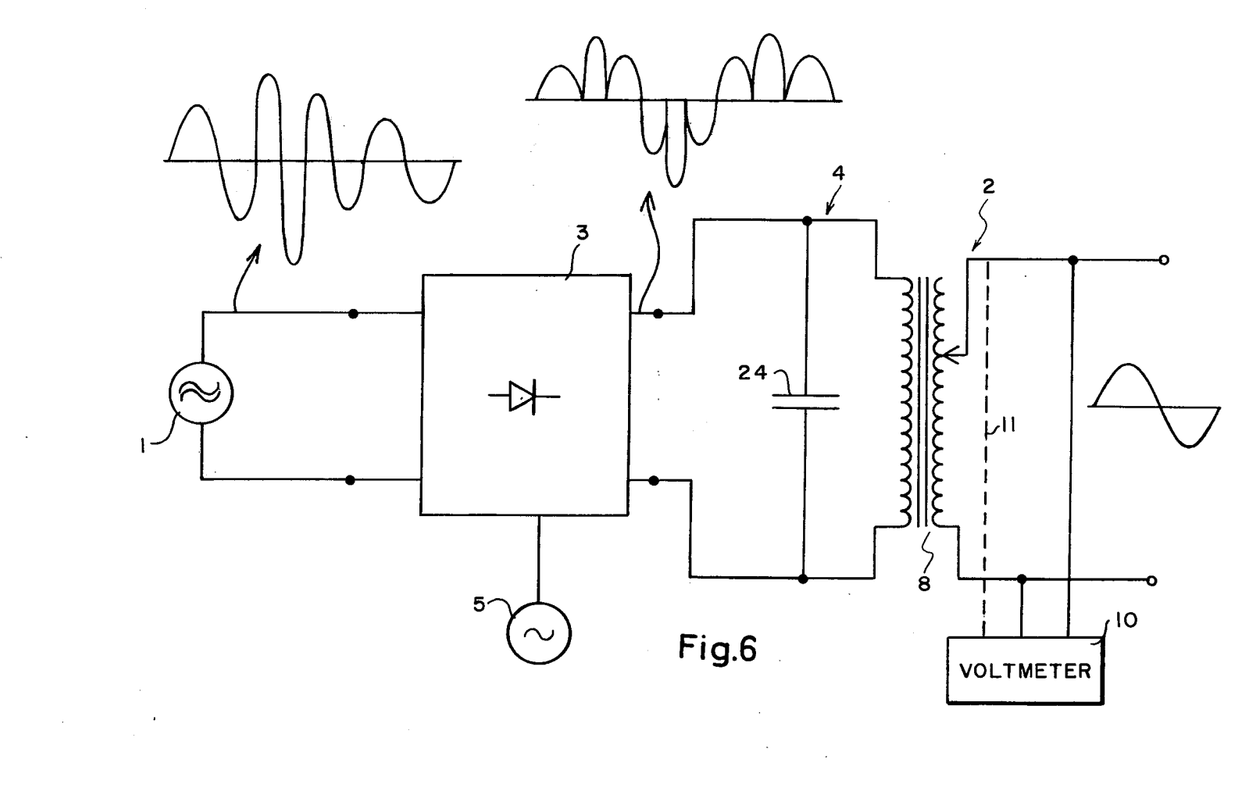
FIG. 6 is a schematic illustration of a further embodiment of a control circuit according to the present invention.

The embodiment according to FIG. 6 shows an arrangement of the control circuit which has been changed as compared to the block diagram according to FIG. 1. In this embodiment, the ac voltage from the generator 1 is supplied directly to the rectifier circuit 3. The amplitude of the rectified ac voltage obtained at the output of the rectifier circuit 3 is not constant. This ac voltage is then supplied to the filter circuit 4 and thereafter to the amplitude control circuit 2. The amplitude control circuit 2 is realized by a regulating transformer 8 as was the case in the aforedescribed embodiment, which is actuated by a voltmeter 10 and an actuating drive 11. The special feature of this embodiment is that only one capacitor 24 is needed as a filter circuit to effect a smoothing of the output ac voltage of the rectifier circuit 3 together with the inductance of the primary coil of the regulating transformer 8. As compared to the embodiment according to FIGS. 1 and 4, however, a somewhat more expensive regulating transformer 8 must be provided in the embodiment according to FIG. 6, since the amplitude of the output voltage to be controlled has a lower frequency than that of the input voltage from generator 1.

Figure 7:
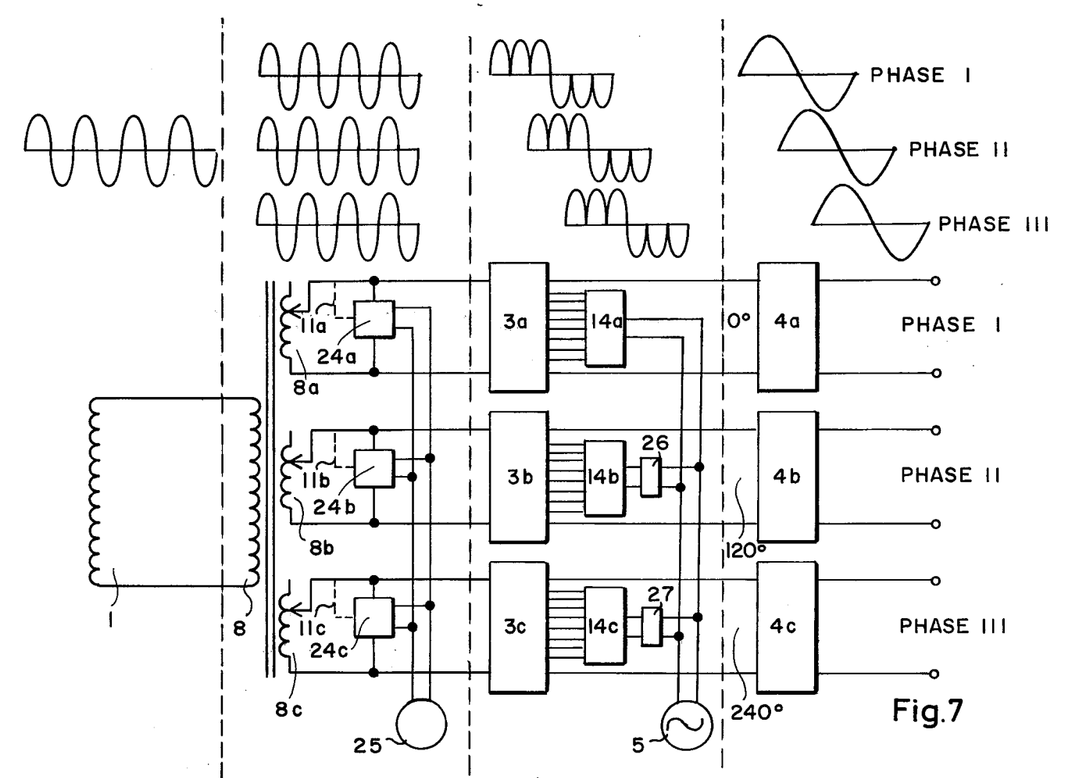
FIG. 7 is a schematic illustration of a further embodiment of a control circuit of the present invention comprising a three-phase output and a single-phase input.

Another preferred embodiment illustrated in FIG. 7 shows a control circuit with which a polyphase output ac voltage may be produced from a single-phase input ac voltage in a simple manner. The production of a polyphase voltage at the output from a single-phase voltage at the generator is advantageous in that a generator may be used which has a minimum number of commutators. The ac voltage of the generator 1 is supplied to a transformer 8 with three secondary windings 8a to 8c, each of which is provided with a control tap. The control taps are controlled by respective differential amplifiers 24a, 24b and 24c via actuating drives 11a, 11b and 11c. The differential amplifiers 24a to 24c are connected to an output voltage source 25. Accordingly, at the outputs of the three secondary windings 8a to 8c, output voltages are formed which have phases and amplitudes which are equal to each other and which are supplied to individual rectifier circuits 3a, 3b and 3c. Individual control circuits 14a to 14c are connected to these three rectifier circuits 3a to 3c. Both the rectifier circuits 3a to 3c as well as the control circuits 14a to 14c correspond to the rectifier circuit 3 and the control circuit 14 according to the embodiment shown in FIG. 4. The control circuit 14a is connected directly to a control ac voltage source 5, whereas the two other control circuits 14b and 14c are in communication with this control ac voltage source 5 via delay members 26 and 27 respectively. Instead of using the delay members 26, 27, control voltages with phase displacement, e.g. from a three-phase current network, may be supplied to the rectifier circuits 3a to 3c directly as well. These two delay members 26 and 27 produce a delay in the ac voltage from the control ac voltage source 5 by a phase angle of 120° or 240°. The result is that the control circuits 14a to 14c are not active at the same time, but operate in work cycles which are displaced by the time intervals corresponding to one-third of the cycles of the control ac voltage. At the outputs of the rectifier circuits 3a to 3c, the rectified ac voltages therefore appear to have phases displaced by 120° respectively. In addition, the rectifier circuits 3a to 3c are connected to filter circuits 4a, 4b and 4c for achieving an approximation of a sinusoidal shape in the manner already described hereinbefore. A three-phase output ac voltage is thus made available in this way.

Figure 8:
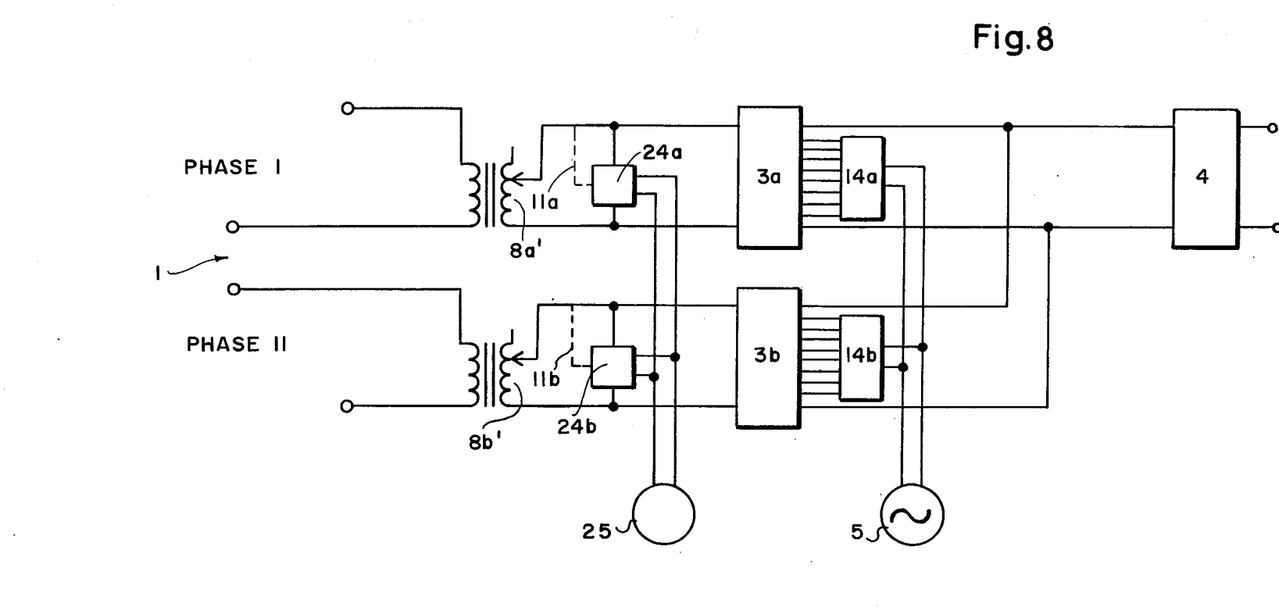
FIG. 8 is a schematic illustration of yet another embodiment of a control circuit according to the present invention comprising a poly-phase input and a single-phase output.

Yet another embodiment is illustrated in FIG. 8 in which the generator 1 inputs two voltages which are 90° out of phase and a single-phase output ac voltage is provided. This embodiment has the advantage that, compared to simple rectification, the ripple of the rectified dc voltage may be reduced very considerably and the filter expense may thereby be reduced. The two 90° out-of-phase ac voltages of the generator 1 are supplied respectively to regulating transformer windings 8a' and 8b' which are regulated by a differential amplifier 24a and 24b respectively and a constant voltage source 25 common to both differential amplifiers 24a, 24b in the manner as in the embodiment according to FIG. 7. These two regulating transformers 8a' and 8b' are respectively connected to a rectifier circuit 3a and 3b which are regulated by a control circuit 14a and 14b respectively. The rectifier circuits 3a and 3b as well as the control circuits 14a and 14b correspond to the rectifier circuit 3 and the control circuit 14 in FIG. 4. The two control circuits 14a and 14b are controlled by a control ac voltage source 5 common to both of then. The outputs of the rectifier circuits 3a and 3b are connected in parallel. These parallel outputs are connected to a filter 4 for smoothing the rectified voltage.

Figure 3:
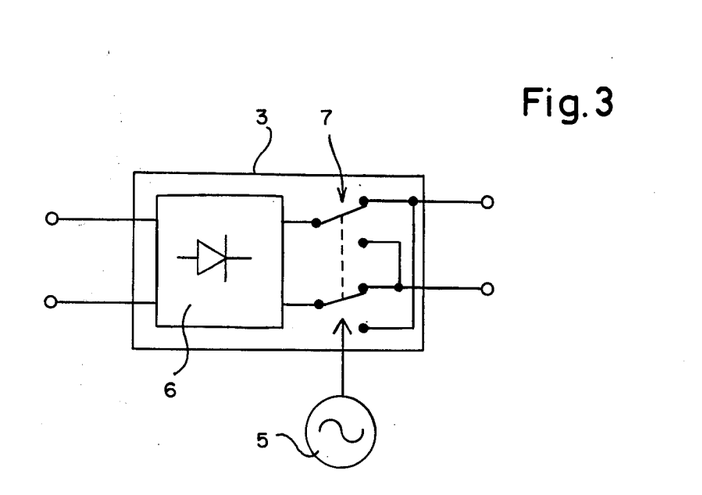
FIG. 3 is a schematic circuit diagram of the principal structure of the rectifier circuit illustrated in FIG. 1.

The illustrated embodiments are only cited by way of example and are not intended to limit the subject matter of the application in any way. Numerous variations of the details of the electrical circuits are possible without straying away from the actual invention. In particular the rectifier circuit shown in FIG. 4 may be constructed in any optional and different manner. For instance, it is not necessary to use a full-wave bridge rectifier circuit. Operation may also be carried out with a half-wave rectifier. Simple diodes may be used instead of the afore-cited thyristors if a switch corresponding to the embodiment according to FIG. 3 is connected to the rectifier arrangement. Triacs with corresponding modified electronic control may also be used as well. In particular, the filter circuit and the control circuit for the rectifier circuit may be constructed in any suitable manner. The aforementioned transformer may also be constructed as an autotransformder. Another preferred embodiment for a rectifier circuit for use in the invention could be a full-wave mid-point rectifier circuit because this requires a smaller number of rectifier elements than a bridge rectifier. It must only be insured that somewhere within the entire control circuit there is amplitude stabilization, that the ac voltage supplied by the generator is rectified in the stated manner and that there is smoothing of the rectified voltage. Optional combinations of the illustrated embodiments with respect to the voltages of different phase which are used or produced all fall within the scope of the invention. For instance, the embodiment according to FIG. 7 may be modified or supplemented such that three 120° out-of-phase generator voltages are used to produce a nine-phase system. Additional input phases may also be combined as shown in the embodiment according to FIG. 8 in order to reduce the ripples.

What is claimed is:

1. A voltage and frequency control circuit for converting an input ac signal with inconstant frequency and amplitude into an output ac signal with constant amplitude and a constant nominal frequency which is lower than the lowest occurring frequency of the input ac signal, said control circuit including serially connected switching units comprising:

amplitude control circuit means for converting an ac signal with inconstant amplitude to an ac signal with constant amplitude, said amplitude control circuit means including a variable transformer and automatic control means for sensing the amplitude of the output signal of said transformer and varying the transformer to maintain said amplitude constant;

rectifier circuit means in communication with said amplitude control circuit means for converting an ac signal with inconstant frequency to alternate positive and negative sets of half-waves of said inconstant frequency signal, including an ac voltage source connected to said rectifier circuit means to provide an ac control signal having a constant nominal frequency such that a positive set of said half-waves is generated by said rectifier means during positive polarity of said control signal and a negative set of said half-waves is generated by said rectifier means during negative polarity of said control means; and filter circuit means in communication with the output of said rectifier circuit means for smoothing and shaping the positive and negative sets of half-waves into a sinusoidal signal having the frequency of said ac voltage source to form said output ac signal.

2. A control circuit according to claim 1, wherein the switching units are connected in series from the input of the control circuit to the output as follows: amplitude control circuit means, rectifier circuit means, and filter circuit means.

3. A control circuit according to claim 1, wherein the switching units are connected in series from the inputs of the control circuit to the output as follows: rectifier circuit means, amplitude control circuit means, and filter circuit means.

4. A control circuit according to claim 1, wherein the switching units are connected in series from the input of the control circuit to the output as follows: rectifier circuit means, filter circuit means, and amplitude control circuit means.

5. A control circuit according to claim 1 wherein the amplitude control circuit means comprises a regulating transformer.

6. A control circuit accoding to claim 1 wherein the rectifier circuit means includes a reversing switch which is regulated by the control signal to provide in alternating sequence a positive and a negative rectified voltage at the switch output synchronized with the zero-axis crossings of the control signal.

7. A control circuit according to claim 6, wherein the rectifier circuit means includes two controllable bridge circuits connected in parallel with each other, each bridge circuit having a plurality of rectifier elements connected together with polarity opposite the polarity of the rectifier elements of the other bridge circuit whereby said bridge circuits are alternatively activated to produce alternate signals of opposite polarity, said bridge circuits being switched to an activated state in alternating sequence during every zero-axis crossing of the control signal.

8. A control circuit according to claim 1 wherein the filter circuit means comprises a filter circuit with a series connected inductance and a parallel connected capacitance, said inductance and capacitance being to provide the nominal frequency.

9. A control circuit according to claim 1 wherein said rectifier circuit means further comprises a rectifier control circuit having a first zero voltage detector in communication with the control signal and having a second voltage detector in communication with the input signal, said first and second zero voltage detectors generating a pulse in response to the control signal and the input signal, respectively, passing through zero, the pulses of the second zero voltage detector activating the rectifier elements of the bridge circuits, and the pulses of the first zero voltage detector switching the polarity of the rectifier elements of the bridge circuits.

10. A control circuit according to claim 9 and further comprising an impulse distributor with pulses from the second zero voltage detector supplied to a first input of said impulse distributor, and sync gate means having inputs from the pulses of the first and second zero voltage detectors for generating a pulse output signal in response to a pulse from the first zero voltage detector only in intervals between two successive impulses from the second zero voltage detector said output signal from the sync gate means being provided to a second input of said impulse distributor, said distributor switching the pulses from the second zero voltage detector to one or the other of two outputs of said distributor, alternatively, in response to the occurrence of a pulse at the second input of said distributor.

11. A control circuit comprising simultaneously a plurality of out-of-phase input ac signals of a polyphase system, wherein each phase is associated with a control circuit according to claim 1, the control signals of each control circuit being out-of-phase with each other so that the output signals of said control circuits also form a polyphase system.

12. A control circuit comprising simultaneously a plurality of out-of-phase input ac signals of a polyphase system, wherein each phase is associated with a control circuit according to claim 1, the output lines of each of the rectifier circuits of the respective control circuits being connected in parallel in order to produce only one phase of an output ac signal.

13. A control circuit comprising a single ac signal supplied by a generator, wherein said single ac signal is simultaneously supplied to a plurality of control circuits according to claim 1 having a plurality of control signals out-of-phase with each other so that the output signals of said control circuits form a polyphase output system.

14. A voltage and frequency control circuit for converting an input ac signal with inconstant frequency and amplitude into an output ac signal with constant amplitude and a constant nominal frequency which is lower than the lowest occurring frequency of the input ac signal, said control circuit including serially connected switching units comprising:
   amplitude control circuit means for converting an ac signal with inconstant amplitude to an ac signal with constant amplitude;
   rectifier circuit means in communication with said amplitude control circuit means for converting an ac signal with inconstant frequency to alternate positive and negative sets of half-waves of said inconstant frequency signal, including an ac voltage source connected to said rectifier circuit means to provide an ac control signal having a constant nominal frequency such that a positive set of said half-waves is generated by said rectifier means during positive polarity of said control signal and a negative set of said half-waves is generated by said rectifier means during negative polarity of said control means, said rectifier circuit means further comprising a rectifier control circuit having a first zero voltage detector in communication with the control signal and having a second zero voltage detector in communication with the input signal, said first and second zero voltage detectors generating a pulse in response to the control signal and the input signal, respectively, passing through zero, the pulses of the second zero voltage detector activating the rectifier elements of the bridge circuits, and the pulses of the first zero voltage detector switching the polarity of the rectifier elements of the bridge circuits; and
   filter circuit means in communication with the output of said rectifier circuit means for smoothing and shaping the positive and negative sets of half-waves into a sinusoidal signal having the frequency of said ac voltage source to form said output ac signal.

15. A voltage and frequency control circuit for converting an input ac signal with inconstant frequency and amplitude into an output ac signal with constant amplitude and a constant nominal frequency which is lower than the lowest occurring frequency of the input ac signal, said control circuit including serially connected switching units comprising:
   amplitude control circuit means for converting an ac signal with inconstant amplitude to an ac signal with constant amplitude;
   rectifier circuit means in communication with said amplitude control circuit means for converting an ac signal with inconstant frequency to alternate positive and negative sets of half-waves of said inconstant frequency signal, including an ac voltage source connected to said rectifier circuit means to provide an ac control signal having a constant nominal frequency such that a positive set of said half-waves is generated by said rectifier means during positive polarity of said control signal and a negative set of said half-waves is generated by said rectifier means during negative polarity of said control means, said rectifier circuit means including first and second bridge circuits in parallel connection, the polarity of the elements in the first bridge circuit being opposite of the polarity of the elements in the second bridge circuit, said ac control signal actuating said first bridge circuit during said positive polarity and said second bridge circuit during said negative polarity; and
   filter circuit means in communication with the output of said rectifier circuit means for smoothing and shaping the positive and negative sets of half-waves into a sinusoidal signal having the frequency of said ac voltage source to form said output ac signal.

* * * * *

UNITED STATES PATENT OFFICE
CERTIFICATE OF CORRECTION

Patent No. 4,038,592                     Dated July 26, 1977

Inventor(s) Franz Stummer

It is certified that error appears in the above-identified patent and that said Letters Patent are hereby corrected as shown below:

Column 3, line 30, "illustratedcontrol" should be — illustrated control —.

Column 3, line 60, "circit" should be — circuit —.

Column 4, line 36, insert —or after the times — between "before at".

Column 5, line 7, "impulsedistributor" should be —impulse distributor —.

Column 5, line 45, insert —pulse — between "from former".

Column 7, line 40, "autotransformder" should be —autotransformer —.

Column 8, line 30, "inputs" should be — input —.

Column 8, line 68, insert — zero — before "voltage".

Column 9, line 8, "9" should be — 14 —.

Signed and Sealed this

Eighth Day of August 1978

[SEAL]

Attest:

RUTH C. MASON
Attesting Officer

DONALD W. BANNER
Commissioner of Patents and Trademarks